US010458666B2

(12) United States Patent
Brown

(10) Patent No.: US 10,458,666 B2
(45) Date of Patent: Oct. 29, 2019

(54) AIR DIFFUSING AND WATER MISTING APPARATUSES, SYSTEMS AND METHODS

(71) Applicant: A-Niks, LLC, Tampa, FL (US)

(72) Inventor: Carlton E. Brown, Tucson, AZ (US)

(73) Assignee: A-NIKS, LLC, Tampa, FL (US)

( * ) Notice: Subject to any disclaimer, the term of this patent is extended or adjusted under 35 U.S.C. 154(b) by 0 days.

(21) Appl. No.: 15/709,255

(22) Filed: Sep. 19, 2017

(65) Prior Publication Data

US 2018/0073754 A1    Mar. 15, 2018

Related U.S. Application Data

(63) Continuation-in-part of application No. 29/561,025, filed on Apr. 12, 2016, now Pat. No. Des. 797,890.

(51) Int. Cl.
| | |
|---|---|
| *F24F 6/14* | (2006.01) |
| *B05B 7/00* | (2006.01) |
| *B05B 7/10* | (2006.01) |
| *B05B 7/04* | (2006.01) |
| *B05B 3/02* | (2006.01) |

(52) U.S. Cl.
CPC ............ *F24F 6/14* (2013.01); *B05B 3/022* (2013.01); *B05B 7/0081* (2013.01); *B05B 7/0416* (2013.01); *B05B 7/10* (2013.01); *F24F 2006/146* (2013.01); *Y02B 30/545* (2013.01)

(58) Field of Classification Search
CPC .. F24F 6/14; F24F 2006/143; F24F 2006/146; B05B 7/0081; B05B 7/0416; B05B 7/10
USPC ....... 239/8, 13, 2.2, 14.2, 77, 282, 283, 289, 239/366, 368, 369, 423, 424, 505, 513, 239/128, 402, 403, 405, 590, 590.5; 261/28, 30, 78.2, DIG. 43; 62/259.4, 62/304; 416/246, 247 R; 248/75

See application file for complete search history.

(56) References Cited

U.S. PATENT DOCUMENTS

| | | | |
|---|---|---|---|
| 3,733,995 A | 5/1973 | Brown | |
| 4,270,577 A | 6/1981 | Brown et al. | |
| 4,716,818 A | 1/1988 | Brown | |
| 4,872,400 A | 10/1989 | Brown et al. | |
| 4,970,836 A | 11/1990 | Brown | |
| 5,598,719 A * | 2/1997 | Jones ................... | B05B 7/0075 62/259.4 |
| 5,645,769 A * | 7/1997 | Tamaru ............... | B01F 3/04007 261/30 |
| D427,303 S | 6/2000 | Brown | |
| 6,139,277 A | 10/2000 | Lopatinsky | |
| 6,194,798 B1 | 2/2001 | Lopatinsky | |

(Continued)

*Primary Examiner* — Steven J Ganey
(74) *Attorney, Agent, or Firm* — Peter B. Scull; HDC IP Law LLP

(57) ABSTRACT

An apparatus, system, and method for providing a non-linear fluid stream into an environment for cooling purposes are disclosed. Such an apparatus includes a body portion and a nozzle, the nozzle being adapted to direct water into the environment. Such an apparatus may include a body portion having a flow channel defined therein for gas flow therethrough; and, a nozzle operatively disposed within the flow channel; said nozzle adapted to direct a liquid therefrom; wherein the channel and the nozzle are operatively disposed relative to each other so that a gas flowing through the channel and the liquid are combined into a fluid stream directed from the apparatus into the surrounding environment.

19 Claims, 18 Drawing Sheets

(56) References Cited

U.S. PATENT DOCUMENTS

| | | | |
|---|---|---|---|
| 6,325,362 B1 * | 12/2001 | Massey | B60H 1/3202 |
| | | | 261/78.2 |
| D456,889 S | 5/2002 | Rossman | |
| 6,388,346 B1 | 5/2002 | Lopatinsky et al. | |
| D521,631 S | 5/2006 | Habensus | |
| D527,812 S | 9/2006 | Brown | |
| D566,261 S | 4/2008 | Brown | |
| D571,450 S | 6/2008 | Brown | |
| D577,100 S | 9/2008 | Brown et al. | |
| 8,006,916 B2 | 8/2011 | Metcalf et al. | |
| 2001/0010340 A1 * | 8/2001 | Utter | B05B 7/0075 |
| | | | 239/423 |
| 2008/0079179 A1 * | 4/2008 | Lundgreen | B01F 5/0451 |
| | | | 261/78.2 |
| 2011/0309158 A1 | 12/2011 | Metcalf et al. | |

* cited by examiner

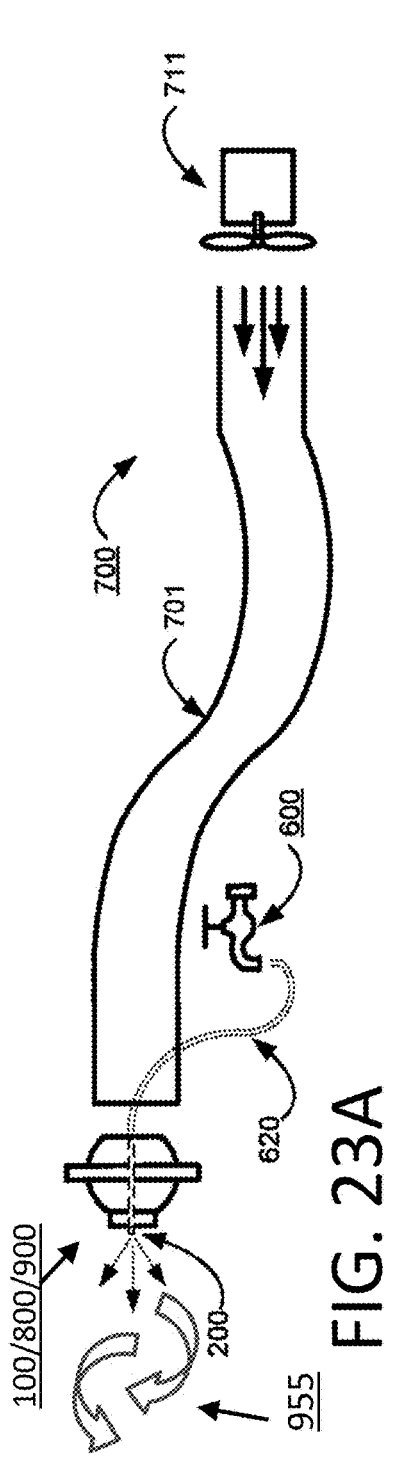
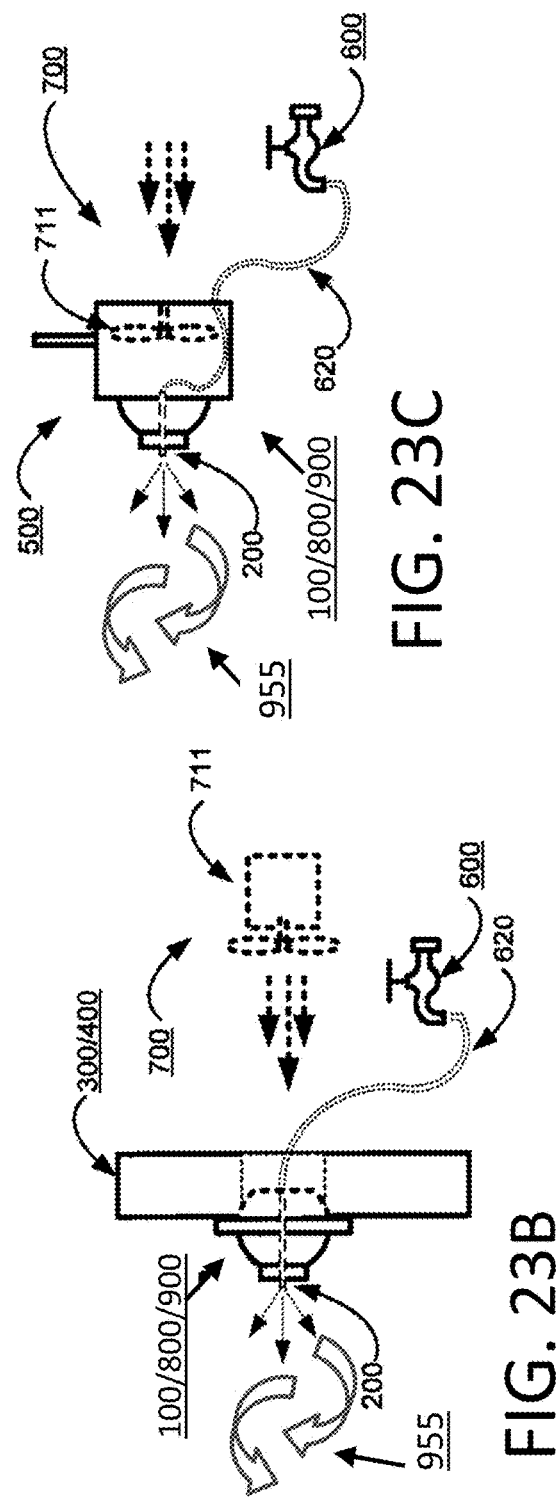

AIR DIFFUSING AND WATER MISTING APPARATUSES, SYSTEMS AND METHODS

BACKGROUND

Apparatuses and methods hereof relate generally to air diffusing and water misting apparatuses and/or methods and systems thereof, and more particularly to apparatuses or devices that can be used to diffuse air and water in a residential or commercial setting, to distribute or disperse a misted stream of water, typically of tiny water droplets, into the air and thereby cool the local environment. Deflected flows including in some examples, spiral or other non-linear flow may be achieved hereby as well.

Evaporative cooling involves the evaporation of a liquid, often in the surrounding air, cooling the surrounding air and thereby the environment in which the liquid has evaporated. One very basic example of evaporative cooling, sweat, involves the body's secretion of what is primarily water, which evaporates off the body and ultimately cools the sweating person. In the context of the present development, the liquid that will evaporate is projected into the ambient air in such a manner that it readily evaporates, cooling the air and environment into which it is projected.

The principle of evaporative cooling is put to use in a number of applications for cooling ambient air. Small-scale evaporative coolers, sometimes called swamp coolers or sump coolers, can be used in residential and certain commercial settings. Wet cooling towers and air washers also use the principle of evaporative cooling, but for different purposes than evaporative coolers. As is relevant here, one application of the principle of evaporative cooling is the misting system.

A typical misting system will involve water forced through a high-pressure pump and tubing through a nozzle with a narrow orifice, creating an exceptionally fine mist at the egress point of the nozzle. The mist contains water droplets so small that they may flash evaporate, absorbing the heat from the air, and reducing the surrounding air temperature rapidly and dramatically. Such a system may be mounted away from the final target area, to cool the air at the target area without necessarily exposing the objects or people in the target area to the mist. Such a system may be used indoors or outdoors.

The various devices and/or methods for dispersing water in a stream of air, some of which are illustrated above, may have to be tailored to the particular application. Due to the nature of some of the devices and/or methods, some do not offer appropriate control over the stream of water or the placement of the various components of the apparatus. In many such situations, these prior methods require undue modification to avoid, i.e., inadvertently getting the occupants of the environment unduly wet.

SUMMARY

Disclosed here are apparatuses and methods for air diffusing and water misting, and more particularly, apparatuses or devices that can be used to distribute air and water in a residential or commercial setting, to disperse a diffused non-linear flow or stream of water into the air for cooling purposes. An apparatus hereof may include a body portion for holding a nozzle with one or more deflectors associated therewith, the body portion having an external portion and an internal, often movable portion, and a support mechanism within the internal circular portion to support the nozzle. The apparatus may also include a pump mechanism operatively connectable to the body portion, the pump mechanism adapted to provide a stream of water of the necessary pressure to enable suitable misting. The body portion may also be disposed, in singular or in plural, in an array to be mounted in a suitable location within an environment.

BRIEF DESCRIPTION OF THE DRAWINGS

Apparatuses and methods hereof will be better understood by reference to the following more detailed description and accompanying drawings in which.

DETAILED DESCRIPTION

Described here are apparatuses and methods for air diffusing and water misting, and more particularly apparatuses or devices that can be used to diffuse air and water in a residential or commercial setting, particularly to distribute or disperse a misted stream of water into a diffused air stream for cooling purposes. Methods for use of such apparatuses are also described.

Accordingly, such an apparatus 100 is illustrated, for a first example in FIGS. 1 through 5. The apparatus 100 may advantageously be used for air diffusing and water misting and may be particularly adapted for use in either an indoor or outdoor environment. As such, the apparatus 100 may provide for controlled delivery of a diffused stream of water, typically a fine mist, to the surrounding environment, which may provide for desirable cooling effects.

An apparatus 100 for misting water in a diffused air stream according hereto may in many implementations be characterized as having a first operational end 101, generally the intake end for both air and water, and a second operational end 102, generally the end through which the misted water and diffused air egress from the apparatus 100 and enter the environment. The first end 101 may also be referred to herein as a back-side and the second side 102 as a front-side.

Figure 1:
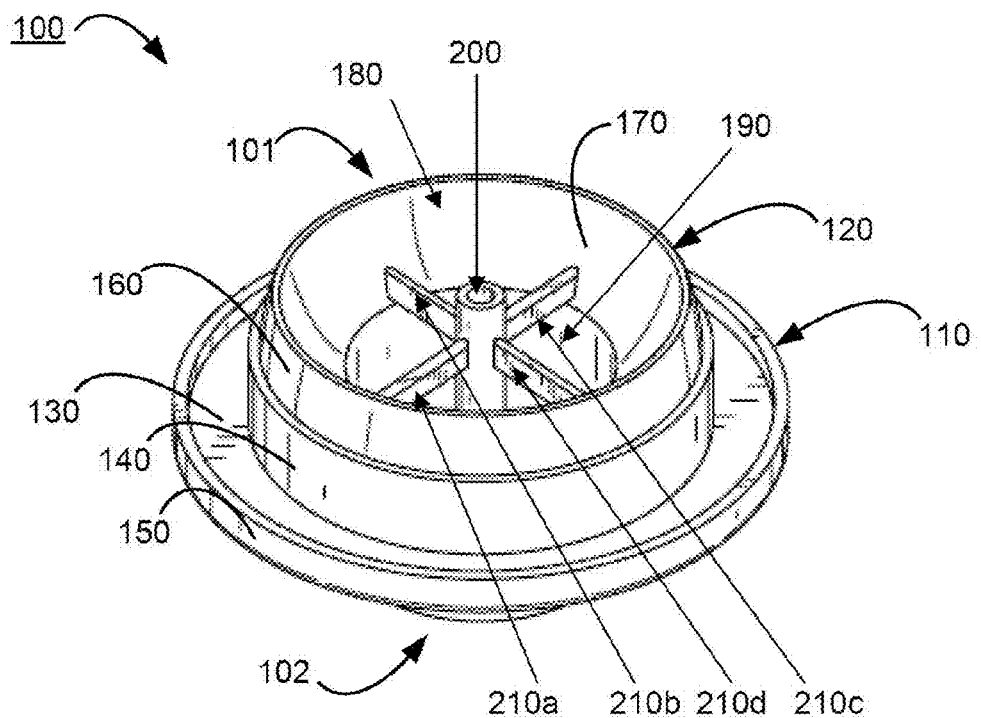
FIG. 1 provides a first, back-side isometric view of an air diffusing and water misting apparatus.
Figure 2:
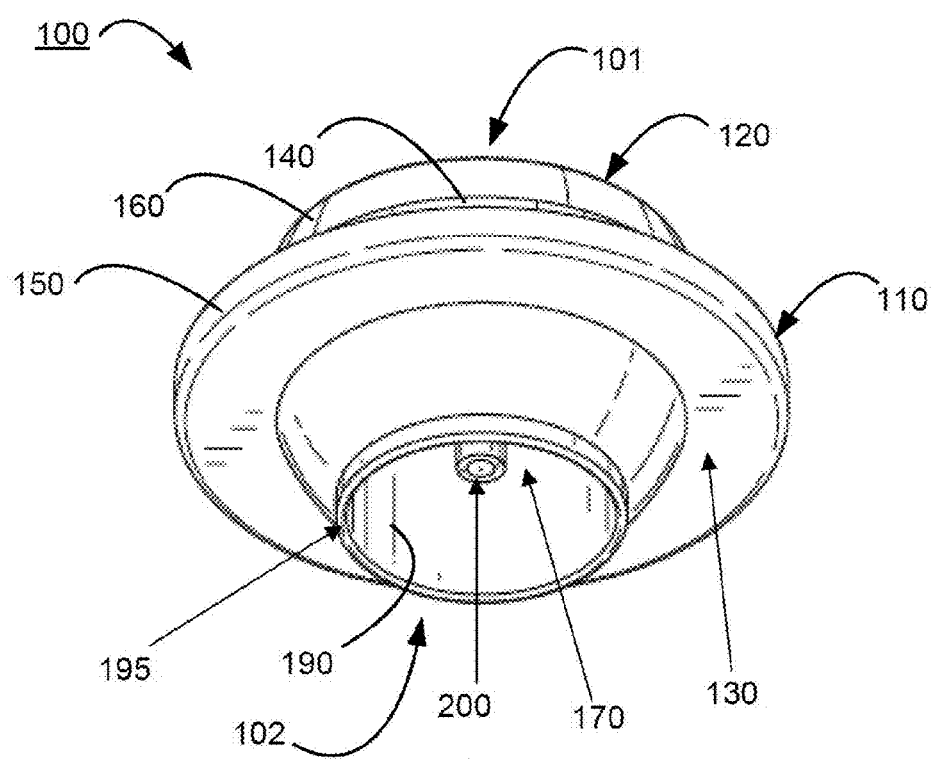
FIG. 2 provides a second, front-side isometric view of an air diffusing and water misting apparatus.
Figure 3:
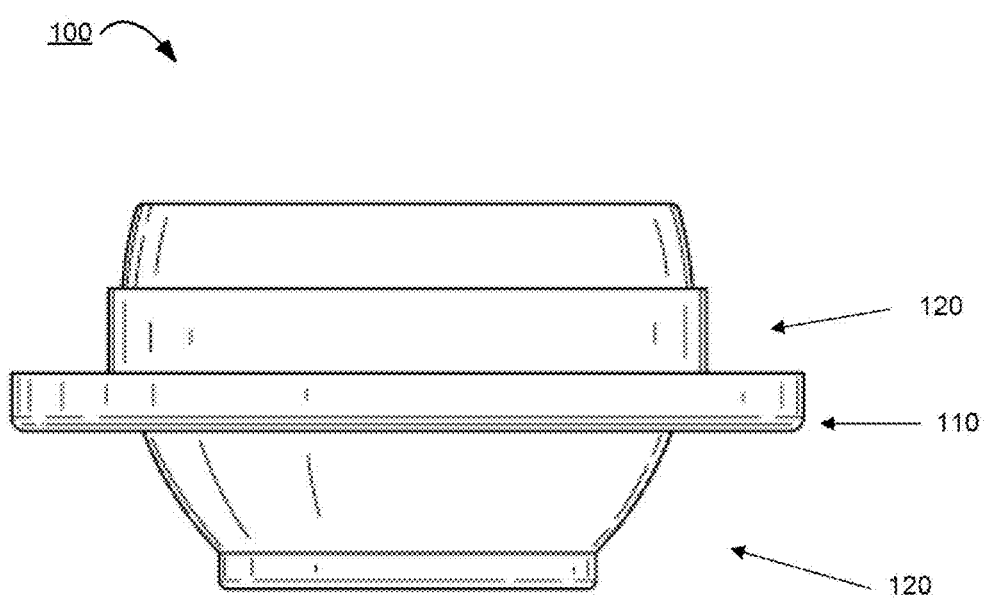
FIG. 3 is a side elevational view of air diffusing and water misting apparatuses like those of FIGS. 1 and 2.
Figure 4:
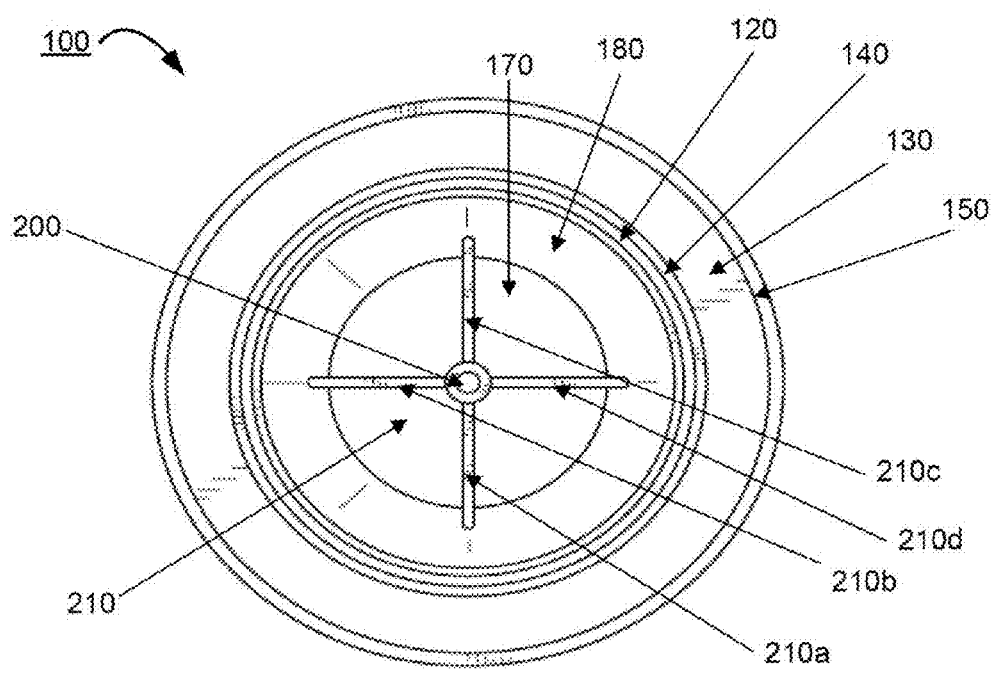
FIG. 4 is a bottom plan view of an air diffusing and water misting apparatus like that of FIG. 1.
Figure 5:
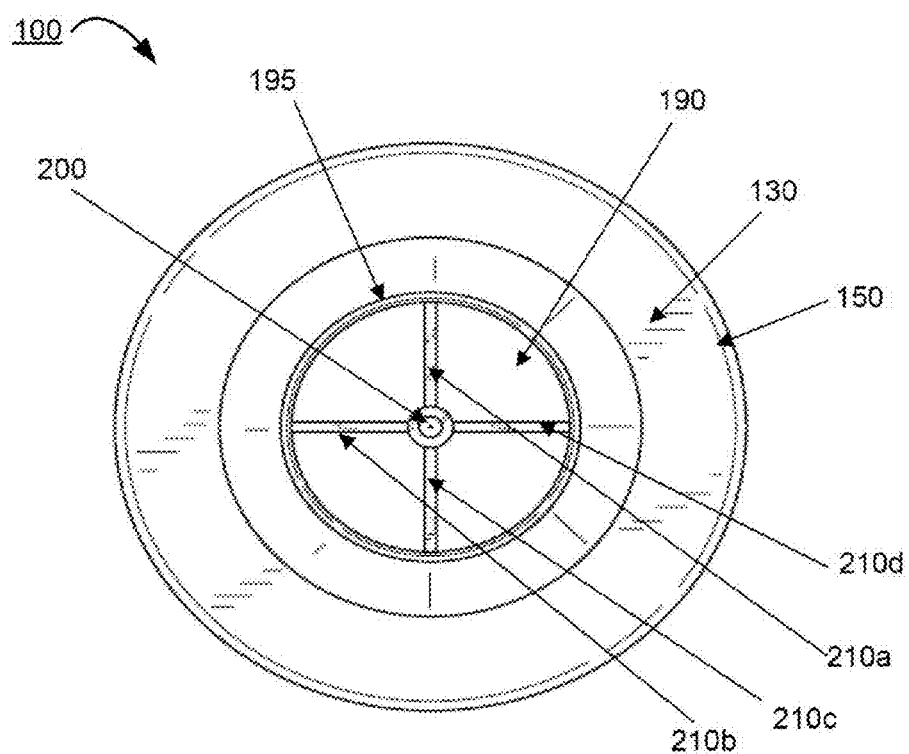
FIG. 5 is a top plan view of an air diffusing and water misting apparatus like those of FIGS. 1 and 2.

The apparatus 100 may include an outer body portion 110 and an inner body portion 120, as shown for example in FIGS. 1 and 2 (noting that in some alternatives only a single body portion may be used, see for non-limiting example, FIGS. 20 and 21 described below). The outer body portion 110 may form the framework within which the inner body portion 120 is disposed. The outer body portion 110 may have several subparts, such as a ring portion 130, an inner lip portion 140, and an outer lip portion 150. The ring portion 130 may, as shown, form the circumference of the apparatus 100. The inner lip portion 140 extends away from the plane of the ring portion 130 and towards the first end 101 of the apparatus 100, forming what is shown here as a circular 'wall' at an approximate right angle to the plane of the ring portion 130. The outer lip portion 150 similarly extends away from the plane of the ring portion 130 and towards the first end 101 of the apparatus 100, thereby forming a smaller circular wall at an approximate right angle to the plane of the ring portion 130.

The inner portion 120 of the apparatus 100 may be adapted to be disposed within the outer portion 110. The inner portion 120 may either be movably or fixedly disposed within the outer portion 110 (shown here may be a non-limiting representation of a semi-spherical "eyeball"-type moving mechanism of the inner portion 120 within the otherwise substantially stationary framework 110; although other inner and outer movement mechanisms for a movable inner portion 120 may alternatively be used). The inner portion 120 may include a partially circular exterior portion 160 and an interior portion 170. The curved nature of the exterior portion 160 may allow the inner portion 120 to move within the outer portion 110 of the apparatus 100. The interior, generally hollowed portion 170 of the inner portion 120 may have or form a concave opening portion 180 at or near the first end 101 and a substantially cylindrical portion 190 at or near the second end 102. Furthermore at or near the second end 102 of the apparatus 100, the inner portion 120 may have a lip 195 (see FIG. 2). The semi-spherical and substantially cylindrical sections 170, 180 and 190 (and lip 195) may thus define the air flow passage through the device 100.

The nozzle portion 200 of the apparatus 100 may be disposed to run substantially longitudinally through the interior portion 120, particularly within the air flow portion 170, and in the shown implementation, through substantially the center of the interior and air flow portions 120 and 170. The nozzle portion 200 may be or present as substantially cylindrical, as shown or may be of some other nozzle shape, whether reducing or expanding (or both) in cross-sectional diameter. The nozzle portion 200 is here held in place by an arrangement 210 of one or more arms (see e.g., FIG. 4), generally; but, more specifically in the FIGS. 1 and 2, here, a first arm 210*a,* a second arm 210*b,* a third arm 210*c,* and a fourth arm 210*d.* The four arms 210*a-d* may, as shown in this implementation but, not by way of limitation, be perpendicular to each other and perpendicular to the nozzle portion 200 and the longitudinal axis of the inner portion 120. More or fewer arms may be used, or other structures, not necessarily arms, straight or otherwise, may be used to dispose the nozzle in the air flow channel 170 of the device 100. Different functionalities may be achieved with alternative dispositions of arms and/or with associated structures as described below.

In operation, water is then flowed through the nozzle 200 from the back-side 101 toward the front-side 102; while typically also, air may be flowed through the airflow channel 170, also from the back-side 101 toward the front-side 102. The nozzle then provides for small droplets of water, typically in a mist form, that can then be carried on a diffusing air stream exiting the device 100 out the front-side 102 thereof. Such an air stream can then be used to deliver the water mist in a desirable direction, and with a desirable, air speed controlled, velocity and/or distance. Otherwise the air stream can itself be cooled by the mist evaporating therein, the cooler air then being flowed or directed to a desired location. Better control of the cooling effect may thus be provided. Moreover, the present developments may reduce ambient temperature by as much as 20 degrees (e.g., more often outdoor temperatures), while substantially keeping surfaces and people cool and dry. The positioning and placement of one or more of the devices may typically be integrated into surroundings, often not merely suspended or placed in a space (although see alternatives below), such as a misting line or fans would be. A movable inner portion 120, if used, may be directed or focused to provide the combined air and water stream to a desired location. An eyeball-type inner portion 120 may provide a wide variety of directionality for such a directed stream. The devices hereof may typically be durable and easy to access for cleaning and service purposes. They may be suitable for placement in commercial or residential settings, or any other installation environment.

The devices and systems hereof may generally utilize low-flow, high-pressure misting combined with a high velocity air delivery system. This method of delivery will typically use a fraction of the water of a typical missing system. The high-velocity air output assists the evaporative process, and may be adapted so that the cool air may decelerate to a target velocity at the target area. The system may also be adapted to use energy and resources sparingly. Furthermore, the use of standard electrical voltage and models that can plug into a wall may provide ease of installation and operation.

An apparatus 100 hereof can be constructed in any suitable and/or conventional manner, in one non-limiting example, by injection molding, using any suitable and/or conventional materials, again, in some non-limiting examples, high-impact plastic or acrylic. Other materials and construction methods could alternatively be used. The outer portion 110, inner portion 120, and nozzle portion 200 may be pre-molded in a similar or dissimilar fashions, and may be pre-made together, or brought together after separate prior forming of each of two or more discretely manufactured parts.

Figure 6:
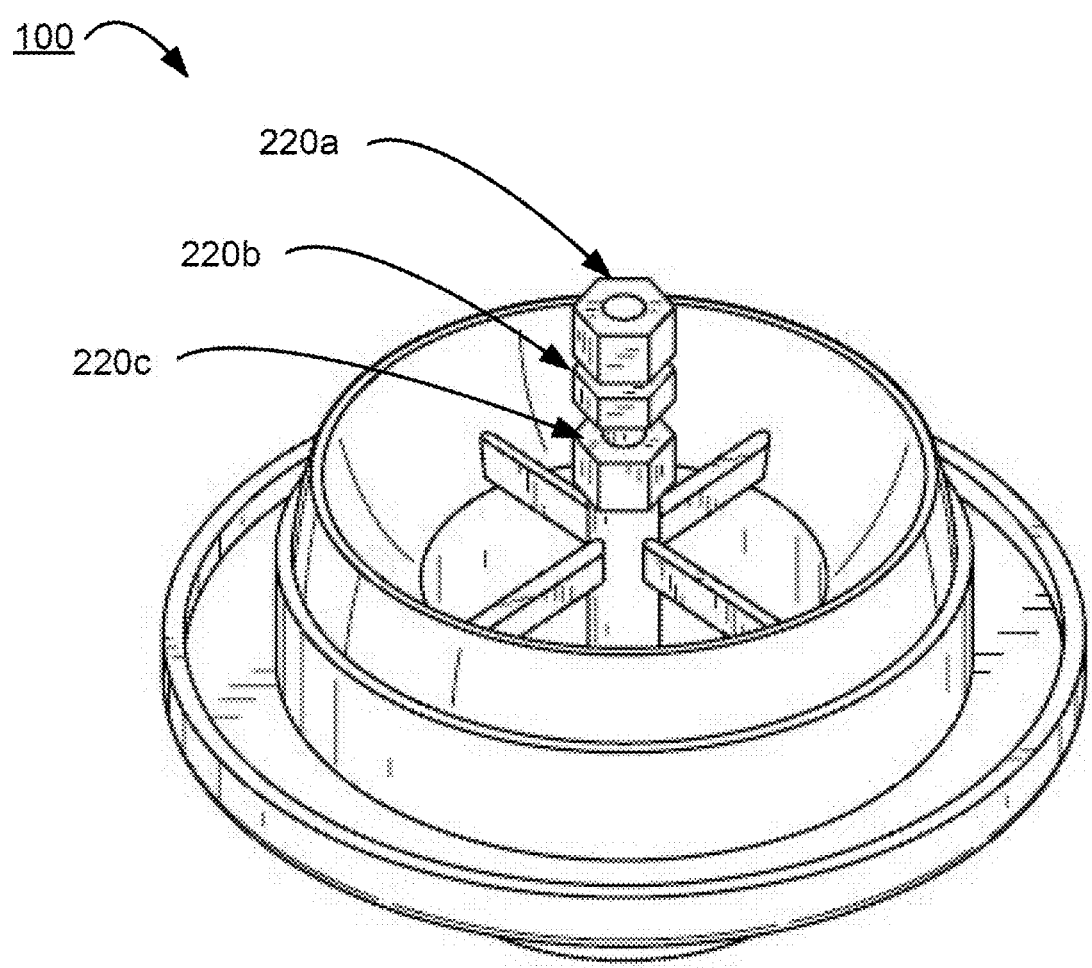
FIG. 6 is a back-side isometric view of an alternative air diffusing and water misting apparatus.
Figure 7:
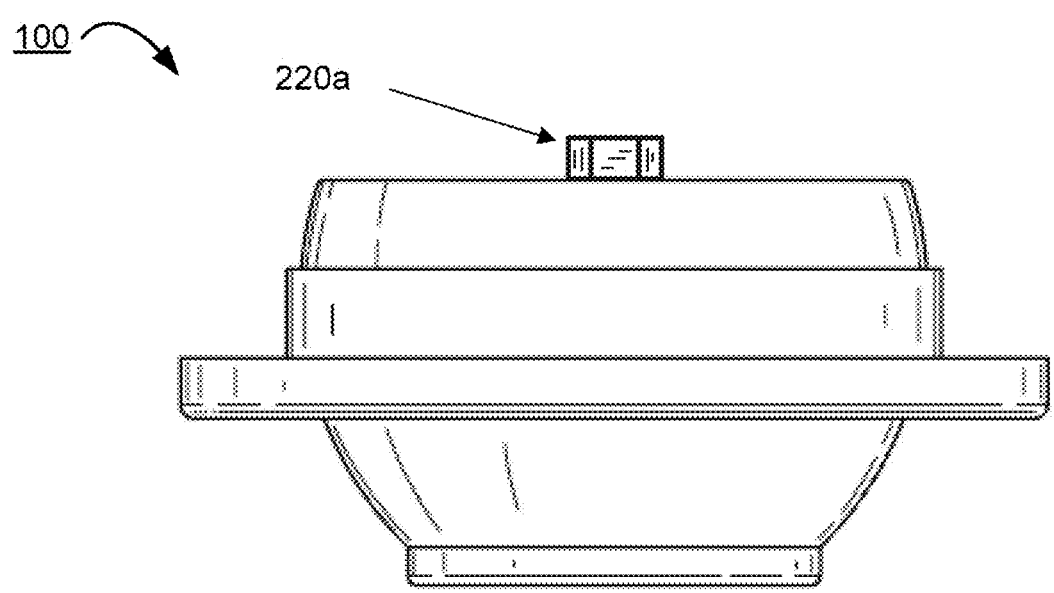
FIG. 7 is a side elevational view of the air diffusing and water misting apparatus of FIG. 6.
Figure 8:
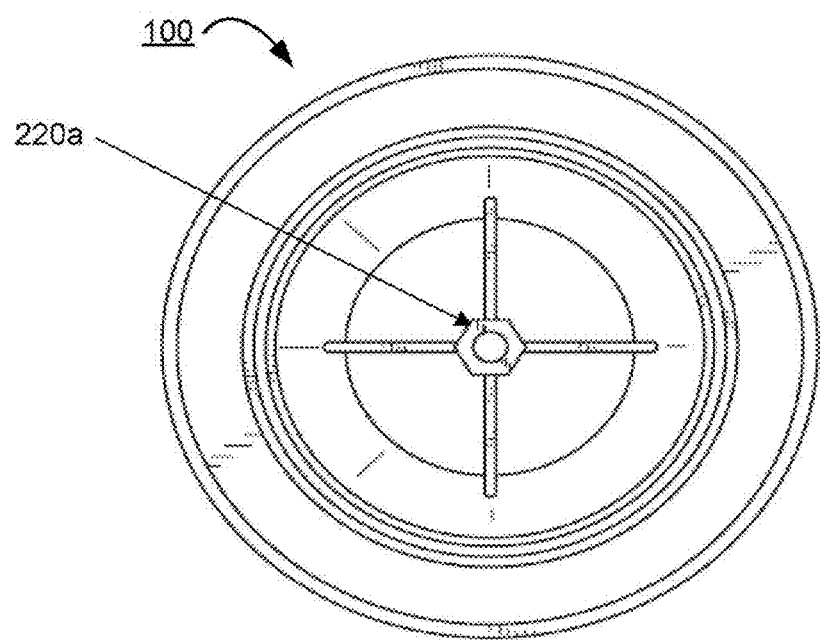
FIG. 8 is a bottom plan view of the air diffusing and water misting apparatus of FIG. 6.
Figure 9:
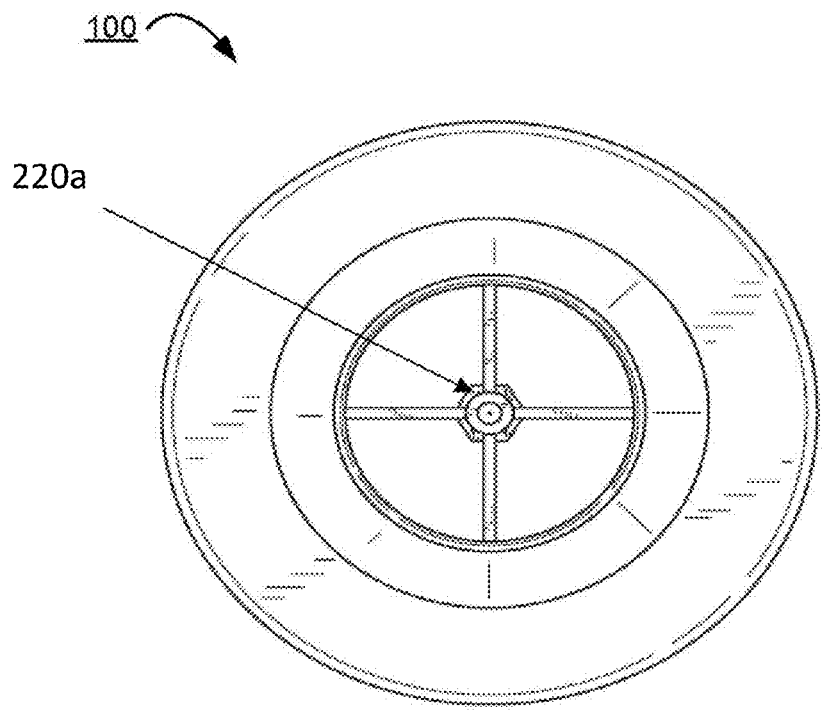
FIG. 9 is top plan view of the air diffusing and water misting apparatus of FIG. 6.
Figure 10:
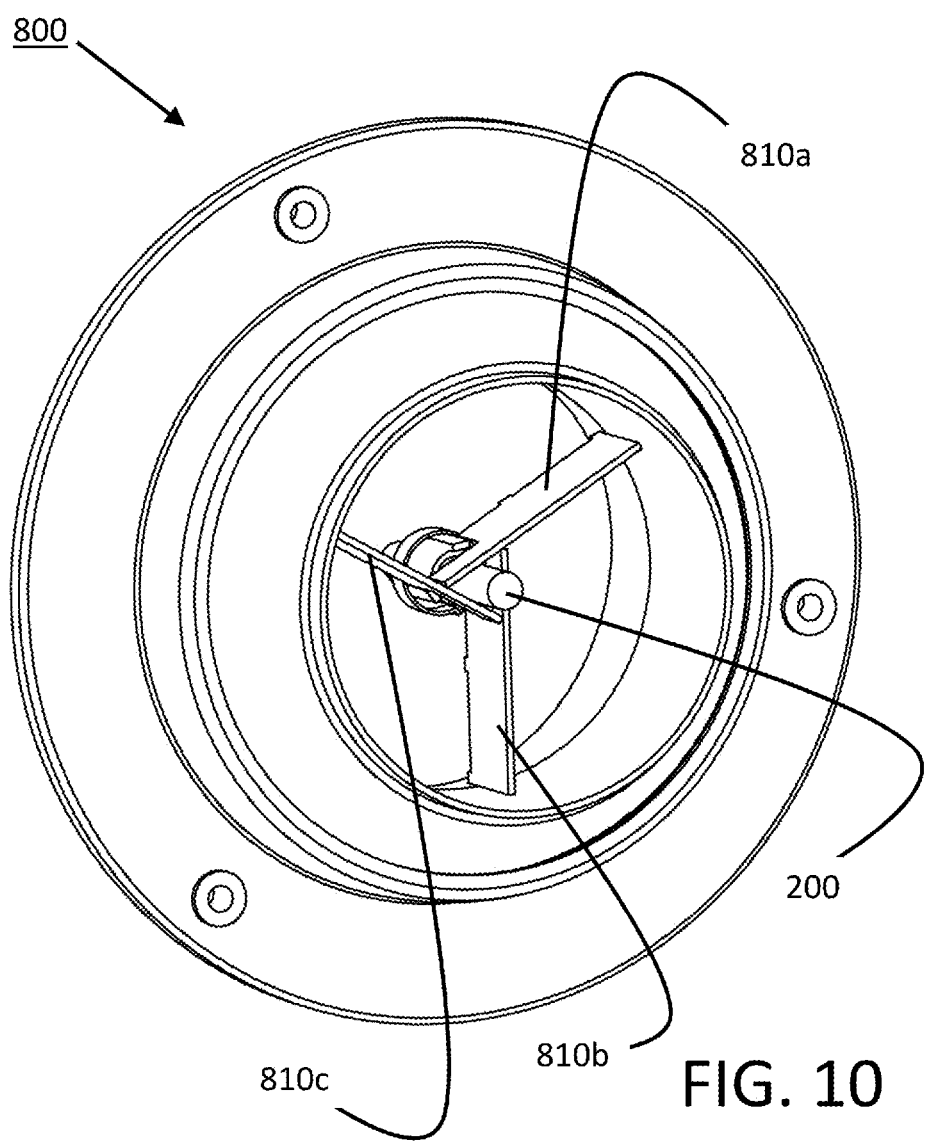
FIG. 10 provides a front-side isometric view of an air diffusing and water misting apparatus hereof.
Figure 11:
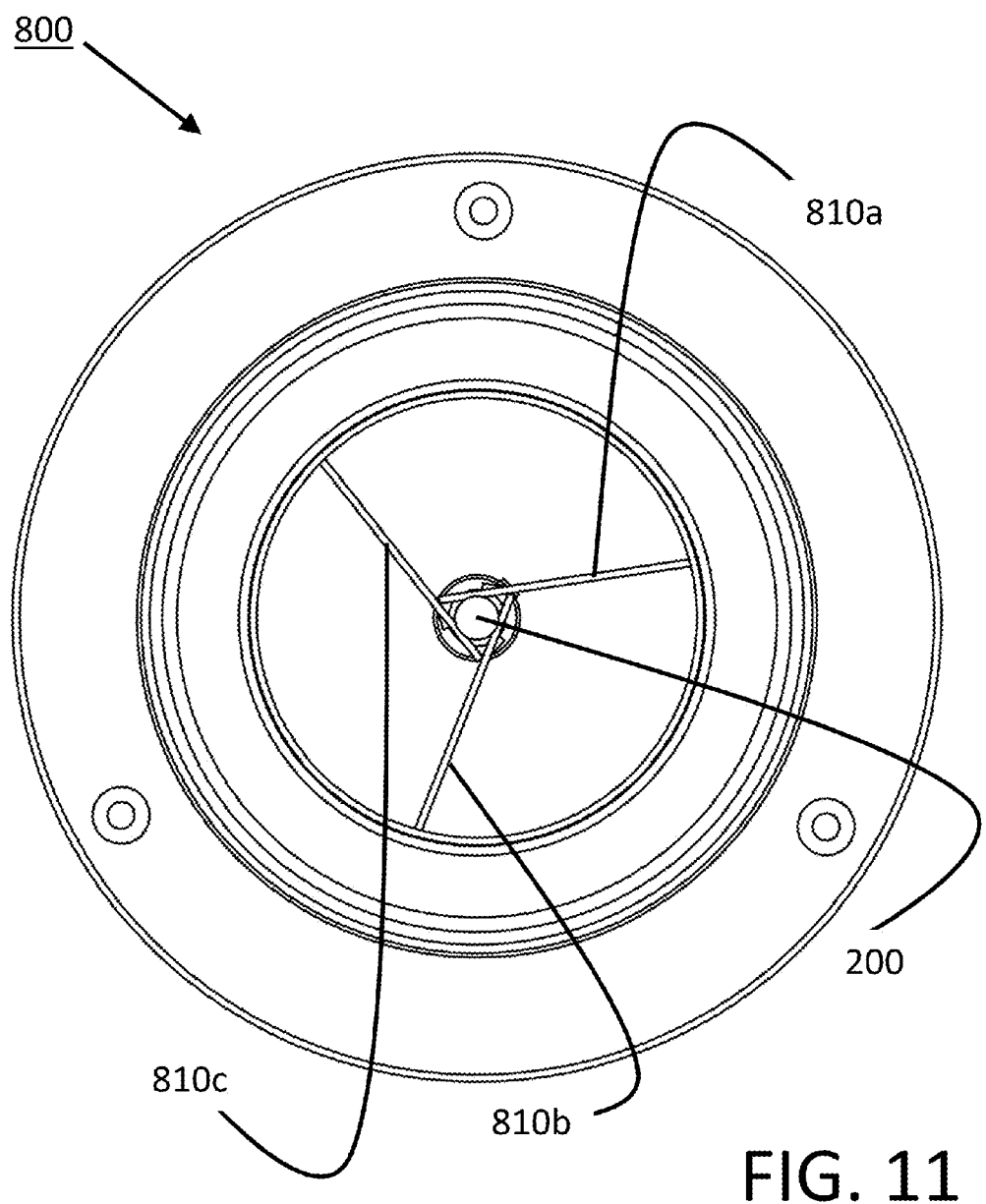
FIG. 11 is a top plan view of an air diffusing and water misting apparatus like that of FIG. 10.
Figure 12:
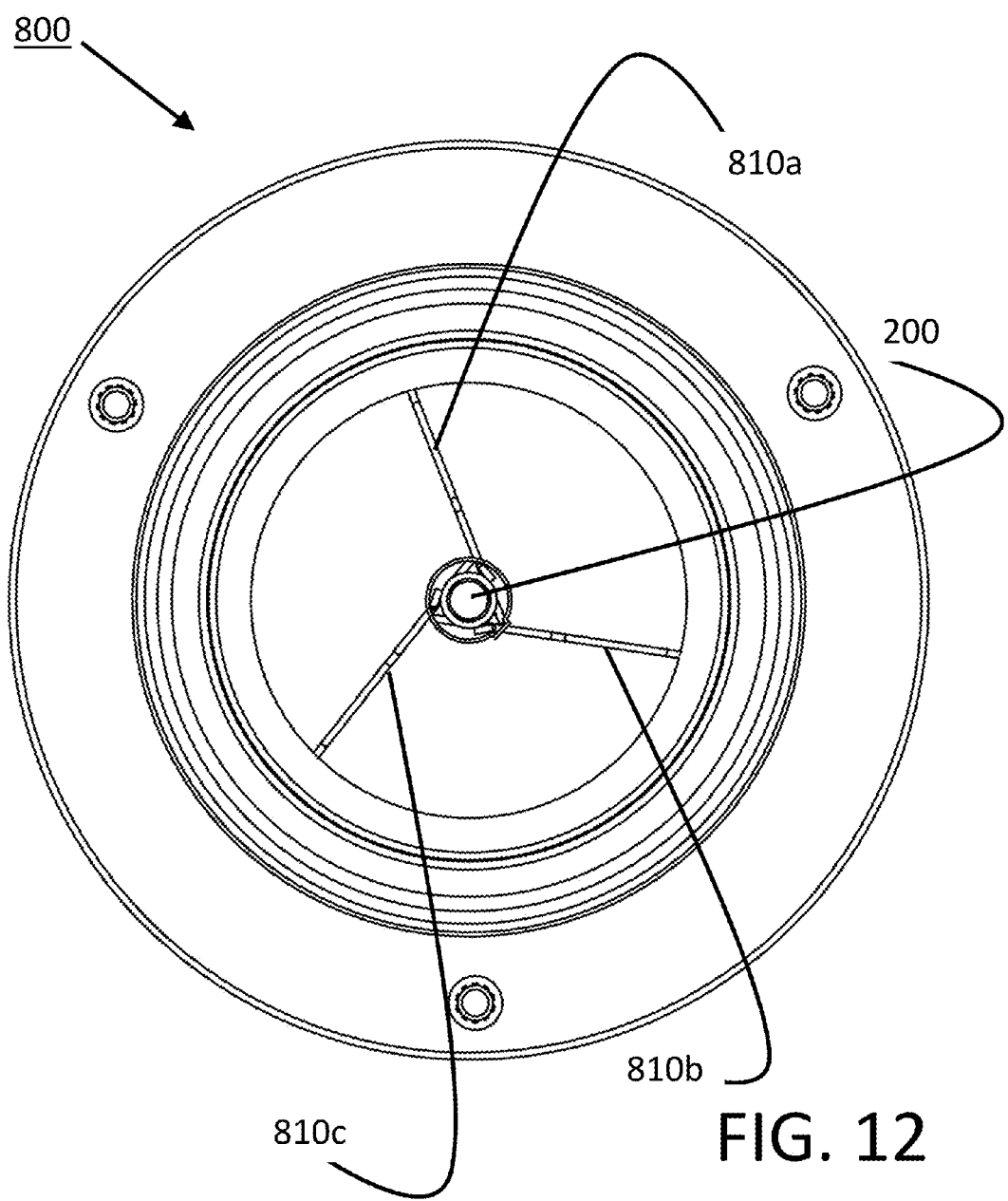
FIG. 12 is a bottom plan view of an air diffusing and water misting apparatus like those of FIGS. 10 and 11.
Figure 13:
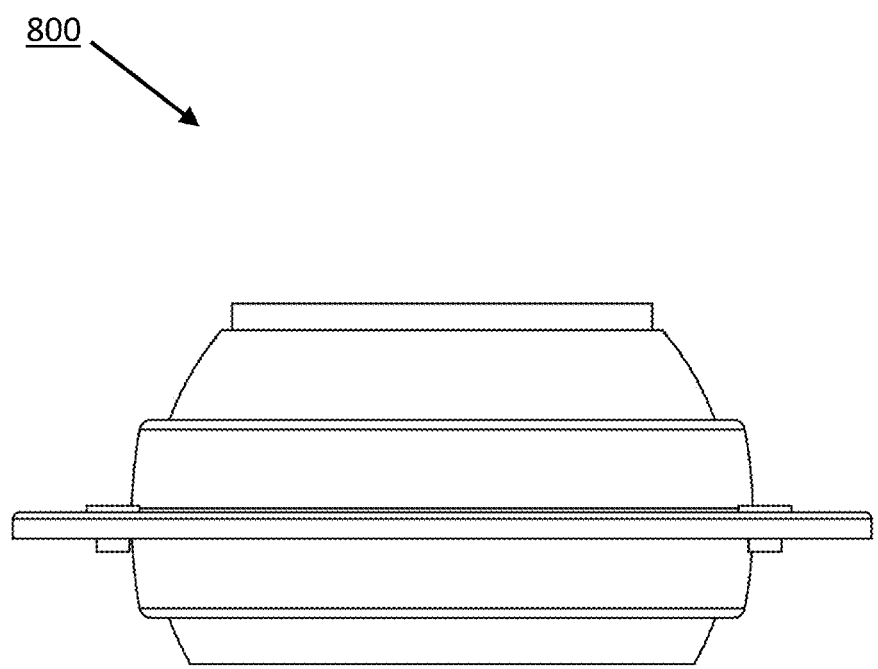
FIG. 13 is a side elevational view of air diffusing and water misting apparatuses like those of FIGS. 10, 11 and 12.
Figure 14:
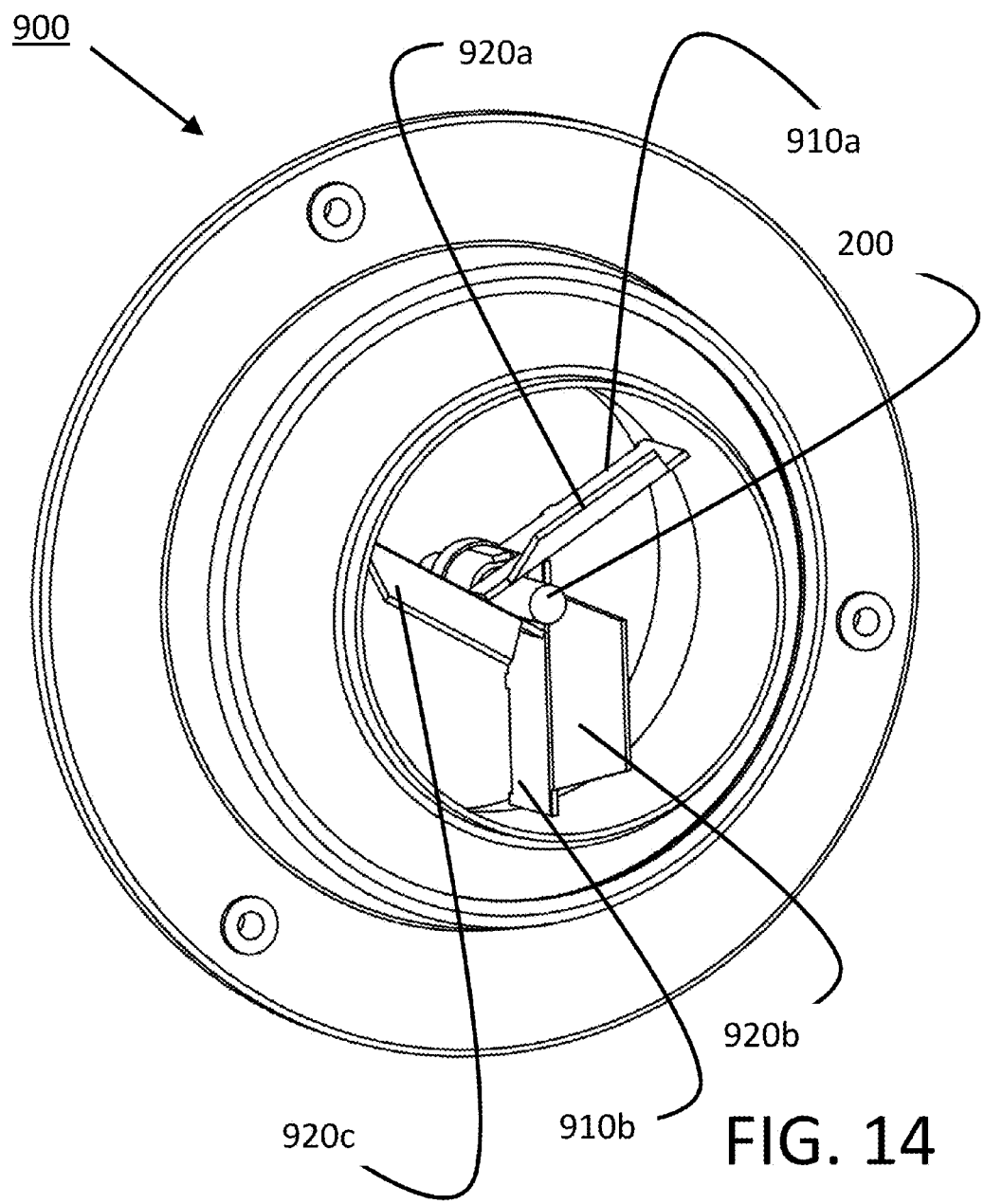
FIG. 14 is a front isometric view of an alternative air diffusing and water misting apparatus.
Figure 15:
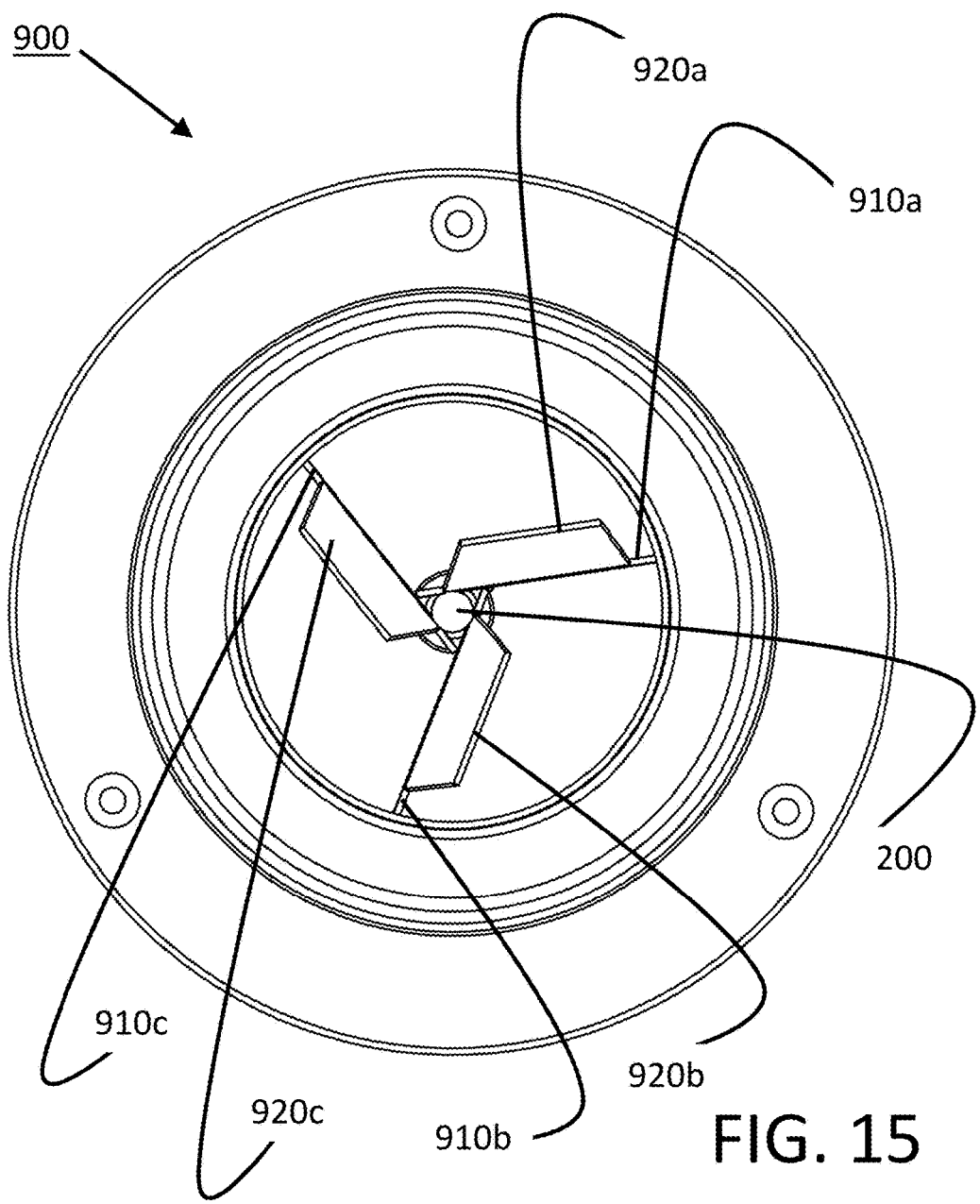
FIG. 15 is a top plan view of the air diffusing and water misting apparatus of FIG. 14.
Figure 16:
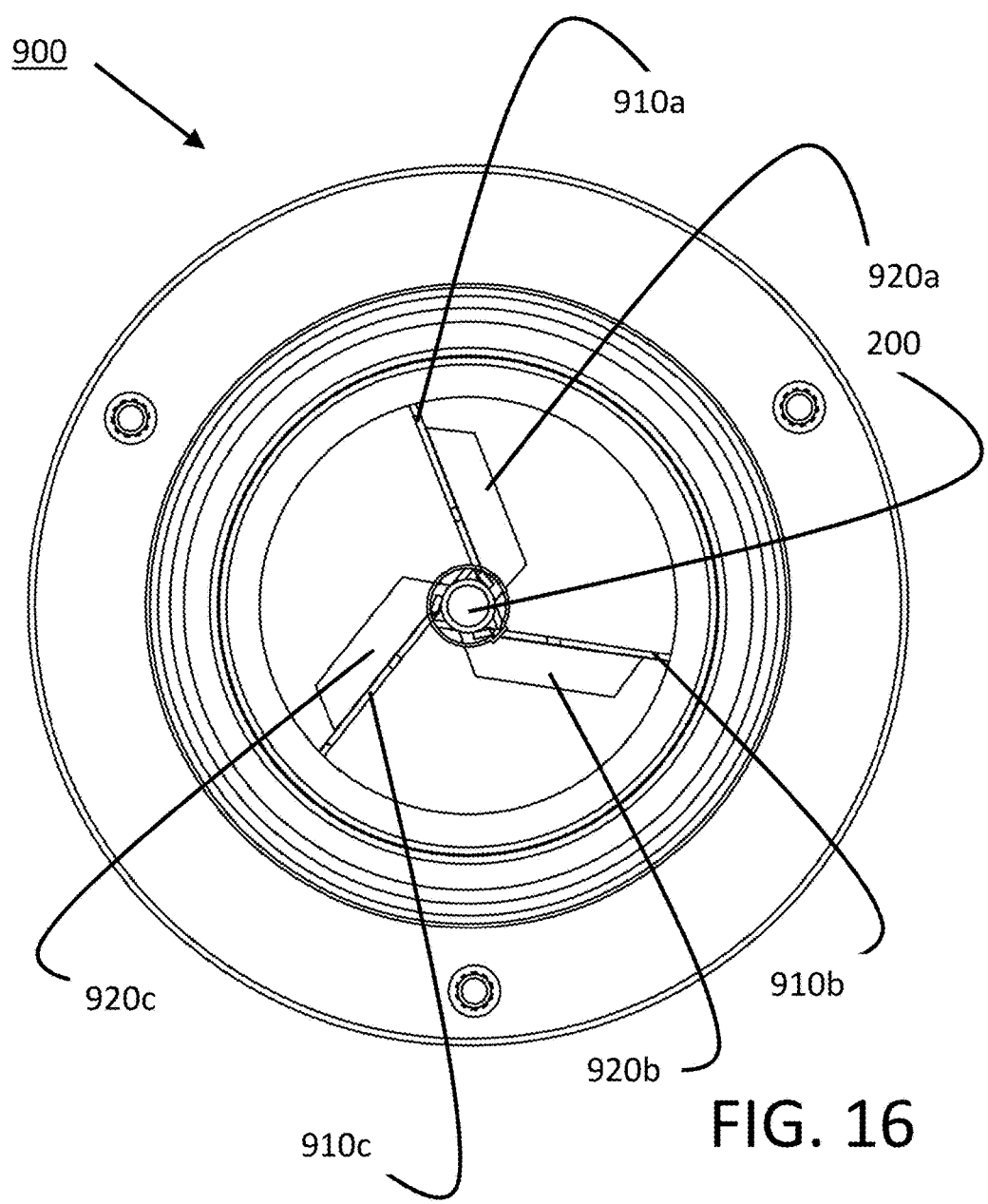
FIG. 16 is a bottom plan view of the air diffusing and water misting apparatus of FIG. 14.
Figure 17:
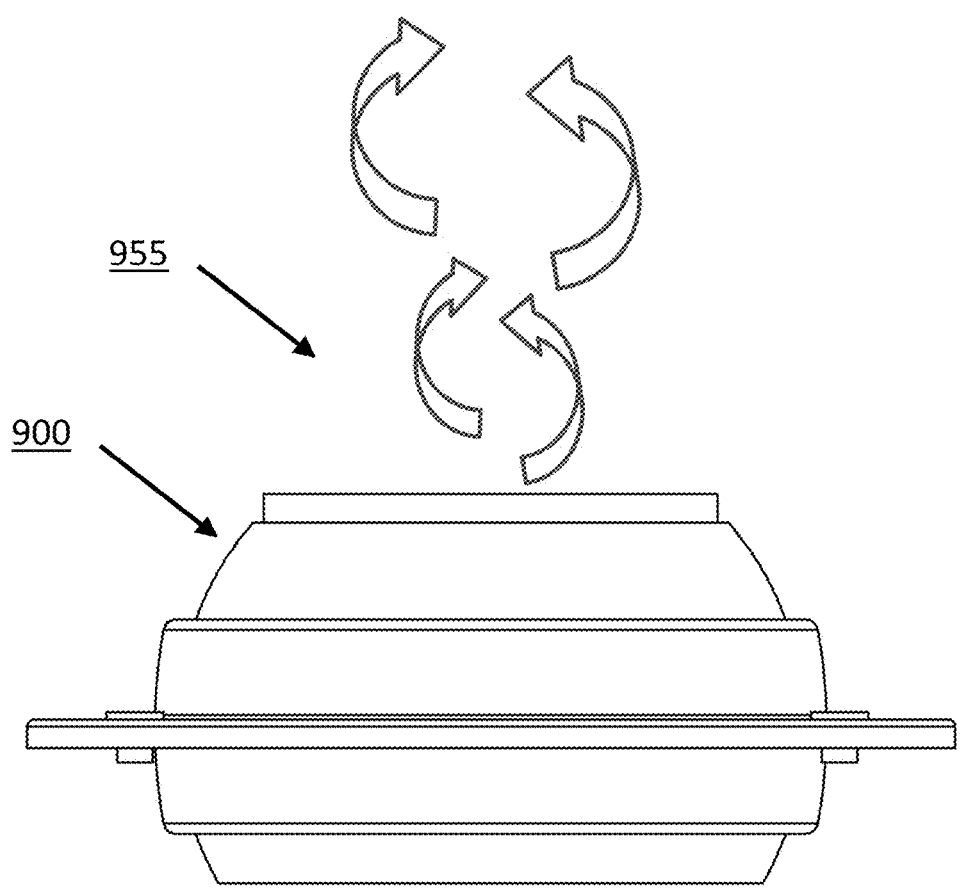
FIG. 17 is side elevational view of the air diffusing and water misting apparatus of FIG. 14.

As was generally true for the apparatus 100 of FIGS. 1-5, the apparatus 100 in FIG. 6 includes a connectability of the nozzle to a water source, here using one or combination or a series of nuts 220*a*, 220*b* and 220*c*, at the first end 101 of the nozzle 200. The nuts 220*a*, 220*b* and 220*c* may provide the function of attaching to a water line, not shown here but see FIGS. 22 and 23 (i.e., 23A, 23B and/or 23C) below, bearing pressurized water, to the nozzle 200. An exemplar distance by which the first nut may extend beyond the plane of the first end 101 of the apparatus 100 is illustrated in FIG. 7. A first end view of the apparatus 100 showing the nut positioned in congruity to the nozzle 200 is illustrated in FIG. 8, and a second end view of the apparatus 100 showing the nut positioned in congruity to the nozzle 200 is illustrated in FIG. 9.

It may be noted that the apparatuses of any of FIGS. 1-9 (and 10-17, inter alia, see below) may thus have a water line attached to the nozzle; however, the air intake is not directly shown. An exemplar usage may include fixing the device 100 one or adjacent a forced air ductwork, not shown here, but see FIG. 23 described in more detail below, providing an egress point for pressurized air flowing through such a duct work. Alternatively, one or more devices may be disposed to receive air in alternative manners; see also FIG. 23, below.

A first alternative implementation is shown in FIGS. 10-13, where an apparatus 800, not unlike apparatus 100 above, however, here shown with three arms 810*a*, 810*b*, and 810*c*. The nozzle portion 200 is here held in place by the arrangement 810 of one or more arms, here, a first arm 810*a*, a second arm 810*b*, and a third arm 810*c*. The three arms 810*a*-*c* may, as shown in this implementation but, not by way of limitation, be angularly disposed relative to each other and offset relative to the nozzle portion 200 and the longitudinal axis of the inner open flow-through area. More or fewer arms may be used, or other structures, not necessarily arms, straight or otherwise, may be used to dispose the nozzle in the air flow channel of the device 800. Different functionalities may be achieved with alternative dispositions of arms and associated structures as described below. The angularly disposed arms 810 may provide for or impose a relative circular flow or spiral or other non-linear flow exiting the apparatus 800. It may be the angular disposition of the arms that achieves non-linear flow. Non-linear flow whether circular or otherwise may provide for moving the air into better contact with the water outlet to mix with the water to generate mist. An angularly disposed flow that crosses the water outlet may better achieve generation of a misting effect. Note, the crossing flow of the air relative to the water outlet may be laminar or turbulent and either may better generate misting. This is described further below.

A further exemplar for providing a circular, spiral or other non-linear flow may be found shown in FIGS. 14, 15, 16 and 17. In these, A further alternative implementation is shown, where an apparatus 900, not unlike apparatuses 100 and 800 above, however, here shown with three arms 910*a*, 910*b*, and 910*c*. The nozzle portion 200 is here held in place by the arrangement 910 of one or more arms, here, a first arm 910*a*, a second arm 910*b*, and a third arm 910*c*. The three arms 910*a*-*c* may, as shown in this implementation but, not by way of limitation, be angularly disposed as was the case in FIGS. 10-13, relative to each other and offset relative to the nozzle portion 200 and the longitudinal axis of the inner open flow-through area. More or fewer arms may be used, or other structures, not necessarily arms, straight or otherwise, may be used to dispose the nozzle in the air flow channel of the device 900. Here for example, louvers or deflector flanges 920*a*, 920*b* and 920*c* are shown as these may be disposed relative or connected to arms 910*a* 910*b* and 910*c*. These deflector structures may more significantly impose a circular, spiral or other non-linear out flow. Different functionalities may be achieved with alternative dispositions of arms and associated structures as described below. The angularly disposed arms 910 and/or the louvers/deflectors 920 may provide for or impose a relative circular spiral or other non-linear flow exiting the apparatus 900. This is described further below but is also shown by example by the schematically represented non-linear outflow 955 in FIG. 17 for a first example. Non-linear flow whether circular or otherwise may provide for moving the air into better contact with the water outlet to mix with the water to generate mist. Louvers or deflectors may better achieve a flattened flow directed more effectively across the water outlet to achieve misting. An angularly disposed flow that crosses the water outlet may better achieve generation of a misting effect. Note, the crossing flow of the air relative to the water outlet may be laminar or turbulent and either may better generate misting.

In operation, as was the case for the examples shown and described relative to FIGS. 1-9, water is then flowed through the nozzle 200 toward the front-side of the apparatuses 800 and/or 900; while typically also, air may be flowed through the airflow channel, also from the back-side toward the front-side of the apparatuses 800/900. The nozzle then provides for small droplets of water, typically in a mist form, that can then be carried on a diffusing air stream exiting the device 800/900 out the front-sides thereof. Such an air stream can then be used to deliver the water mist in a desirable direction, here shown with a possible circular, spiral, or cyclone like rotational or other non-linear flow (see e.g., flow 955 in FIG. 17) and with a desirable, air speed controlled, velocity and/or distance (note the flow may be laminar or it may be that the arms and/or louvers impose some turbulence, though non-linear is typical regardless whether laminar or turbulent). Non-linear flow whether circular, spiral or rotational or otherwise may provide for moving the air into better contact with water exiting at the water outlet to mix with the air with the water to generate mist. Better contact may include better mixing and/or better mist generation. An angularly disposed flow that crosses the water outlet may better achieve generation of a misting effect. Note, the crossing flow of the air relative to the water outlet may be laminar or turbulent and either may better generate misting. Otherwise the air stream can itself be cooled by the mist evaporating therein, the cooler air then being flowed or directed to a desired location. Better control of the cooling effect may thus be provided. Moreover, the present developments may reduce ambient temperature by as much as 20 degrees (e.g., more often outdoor temperatures), while substantially keeping surfaces and people cool and dry. The positioning and placement of one or more of the devices may typically be integrated into surroundings, often not merely suspended or placed in a space (although see alternatives below), such as a misting line or fans would be. A movable inner portion (as described for the examples of FIGS. 1-9 above), if used, may be directed or focused to provide the combined air and water stream to a desired location. An eyeball-type inner portion may provide a wide variety of directionality for such a directed stream. The devices hereof may typically be durable and easy to access for cleaning and service purposes. They may be suitable for placement in commercial or residential settings, or any other installation environment.

Figure 18:
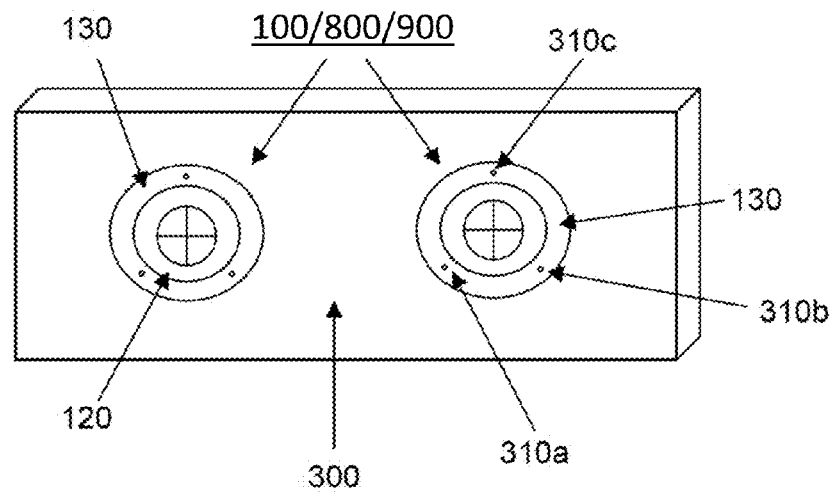
FIG. 18 is an isometric view of a wall unit incorporating two air diffusing and water misting apparatuses hereof.

In view hereof, FIG. 18 illustrates another implementation of an apparatus hereof, here, as a wall-mount unit 300. Two of the apparatuses 100 and/or 800 and/or 900 are shown disposed on/within the wall mount unit 300. Each apparatus 100/800/900 is mounted on/in the wall unit 300, which can then be mounted on the interior or exterior surface of a building wall or hung from a ceiling, e.g. An exemplar mounting may include apparatus 100/800/900 being affixed to the wall unit through screws 310a, b, and c, driven through the circular ring 130 of the apparatus 100/800/900 and serving to fixedly adhere the circular ring 130 of the apparatus to the wall mount unit 300, ring 130 thus holding frame portion 110 substantially stationary relative to the mounting unit 300. Note that the inner portion 120 of the apparatus 100/800/900, not being fixedly mounted to the wall mount unit 300, may still move within the outer portion 110 to thus still provide directional alternatives for the air and water stream emitted therefrom. The second end 102 of the apparatus 100/800/900 is thus presented outwardly, here, visible, as is the exit portion of the nozzle 200 disposed therein. The wall mount unit 300 may be affixed on or near a wall or other surface of a building, typically near enough to a wall to permit connection of the water line, but far enough away to allow for the free circulation of ambient air. Note, air intake for such a unit can either be by way of a ductwork as above and relative to FIG. 23 below, or more typically, one or more fans, not shown here, but see FIG. 23 below, may be included to bring in ambient air so long as the mounting unit 300 is disposed sufficiently far from a wall. Note, fan usage is described further below.

Figure 19:
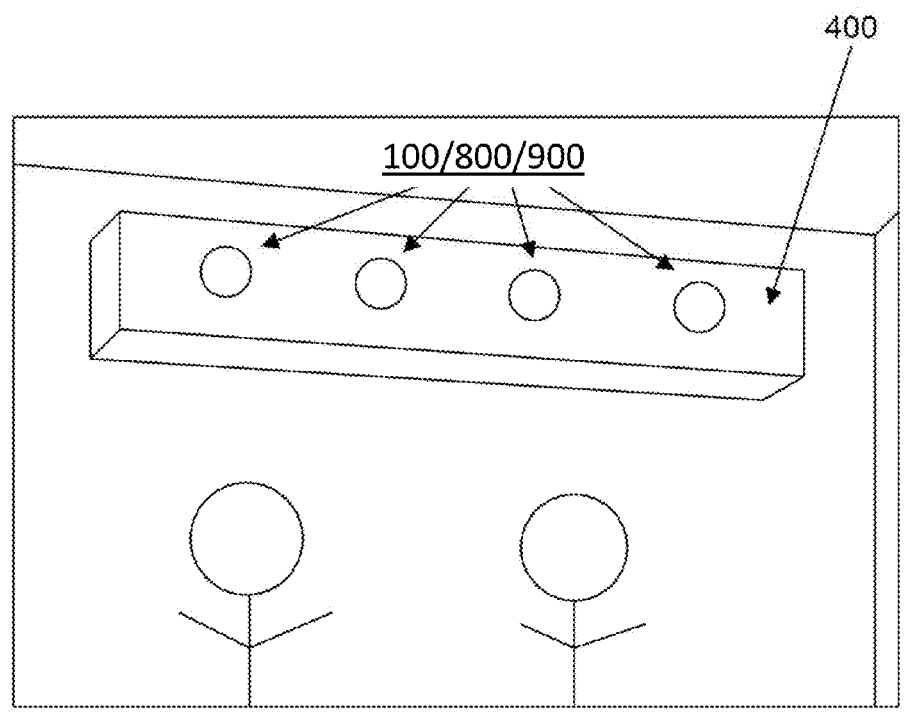
FIG. 19 is an isometric view of a wall unit incorporating four air diffusing and water misting apparatuses hereof.

In FIG. 19, a similar wall mount system 400 is illustrated, again typically far enough away from the wall on which it is mounted to permit free circulation of ambient air from behind the mounting system 400 to allow air to enter the back-side 101 for flow through the device 100/800/900, back to front. In this wall mount system 400, there are four of the apparatuses 100/800/900, mounted at a suitable distance from each other to allow for effective dispersion of the misted water.

Figure 20:
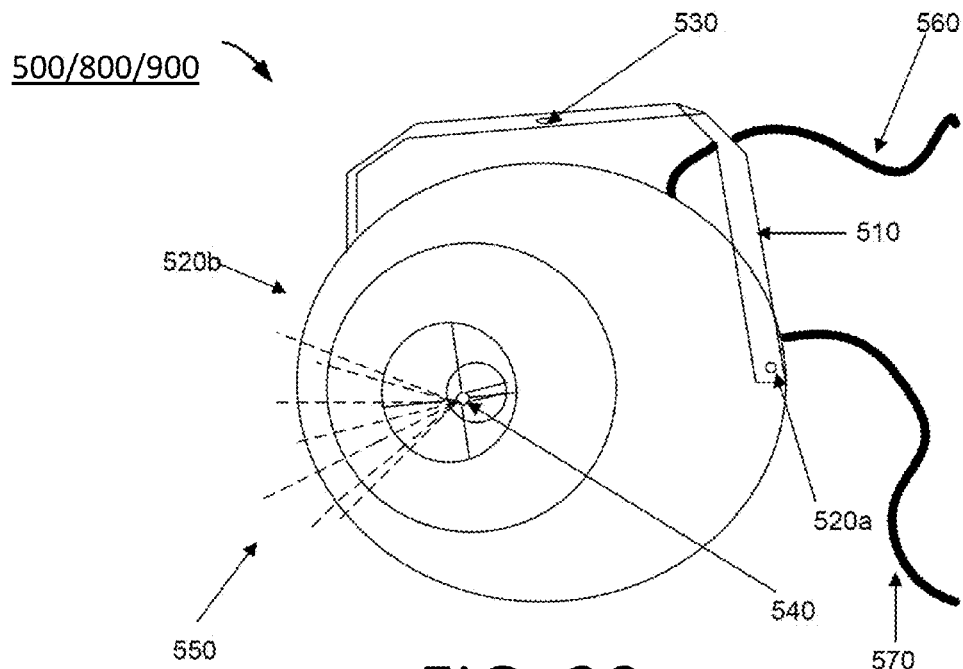
FIG. 20 is an isometric view of an alternative apparatus including water line and ceiling mount.
Figure 21:
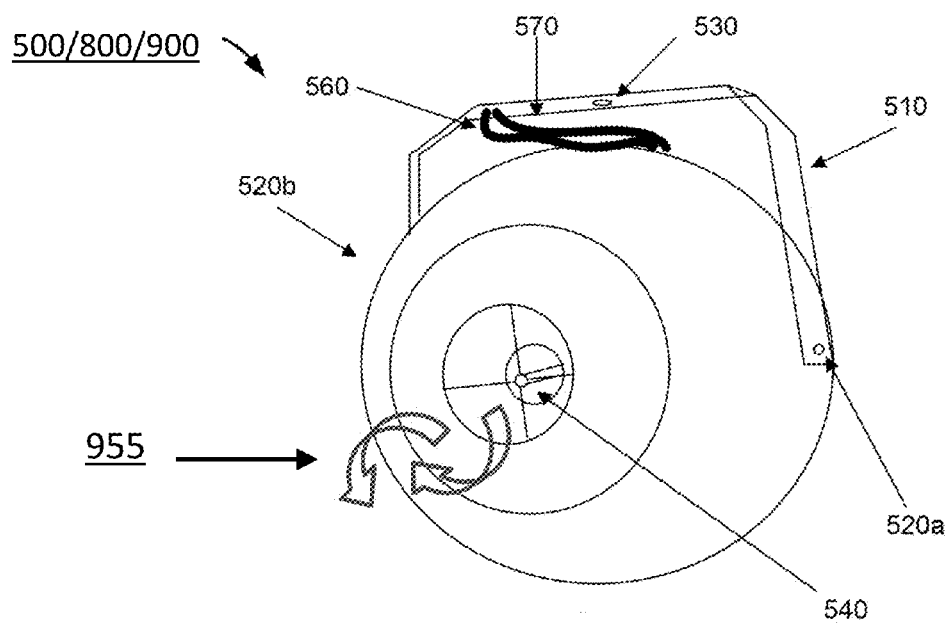
FIG. 21 is another isometric view of an alternative apparatus including ceiling mount.

FIGS. 20 and 21 illustrate a different variety of apparatus 500/800/900 but still within the scope hereof. In this version, the overall device may be made of a single molded piece, without the two-piece, eyeball-type motion of the device shown in FIGS. 1-9 (e.g., only a single body portion, not two or more). The rotation of the stream outlet for directional control of this device might then come from the way it is mounted. In FIG. 20, the mounting bracket 510 may be rotatably attached to the body of the apparatus 500/800/900 at least at point 520a (shown) and 520b (not shown) and rotatably attached to the ceiling at point 530. The nozzle 540 is visible in both FIG. 20 and FIG. 21; in FIG. 20, the mist of water 550 is also visible. The attachments of the apparatus 500/800/900 to the mounting bracket 510 at points 520a and 520b may allow the apparatus 500/800/900 to move in a vertically arced manner such a way that the nozzle 540 and with it the mist of water 550 may be angled either more toward or more away from the ceiling. The mount 530 may allow the apparatus 500/800/900 to be moved laterally so that the nozzle 540 and with it the mist of water 550 may be angled in any position defined by a circle of rotation about point 530 to reach a desired target.

The apparatuses 500/800/900 illustrated in FIGS. 20 and 21 also show utilization of a different air flow or pumping mechanism than the apparatus described earlier. Shown in FIG. 20 are a water line 560 feeding directly into the apparatus 500/800/900 (as ultimately connected on the back-side with the nozzle 540, to feed water to the nozzle 540), and an electrical wire 570 leading directly to the apparatus 500/800/900. The apparatus 500/800/900 may contain an internal fan, not shown, to provide a flow of air through the air flow channel and thus capture and carry the atomized water from the apparatus 500/800/900. In a functional alternative, the flow of air forced by the internal fan may assist in creating the smaller water droplets, i.e., helping to atomize the water within the apparatus 500/800/900. In such case, the incoming water entering through the water line 560 may or may not need to be pressurized or need a small nozzle orifice, due to the potential for air flow assistance in creating tiny water droplets for dispersion. In any case, the incoming water entering through the water line 560 may either be atomized by the internal fan, or merely carried by the air flow caused by the fan, and thereafter issue from the nozzle 540 and device 500/800/900 as a mist of water 550. An alternative possible circular/rotational/spiral or other non-linear outflow 955 is shown in FIG. 21 for the possible effect of apparatuses 800 and/or 900 used herein/herewith.

Figure 22:
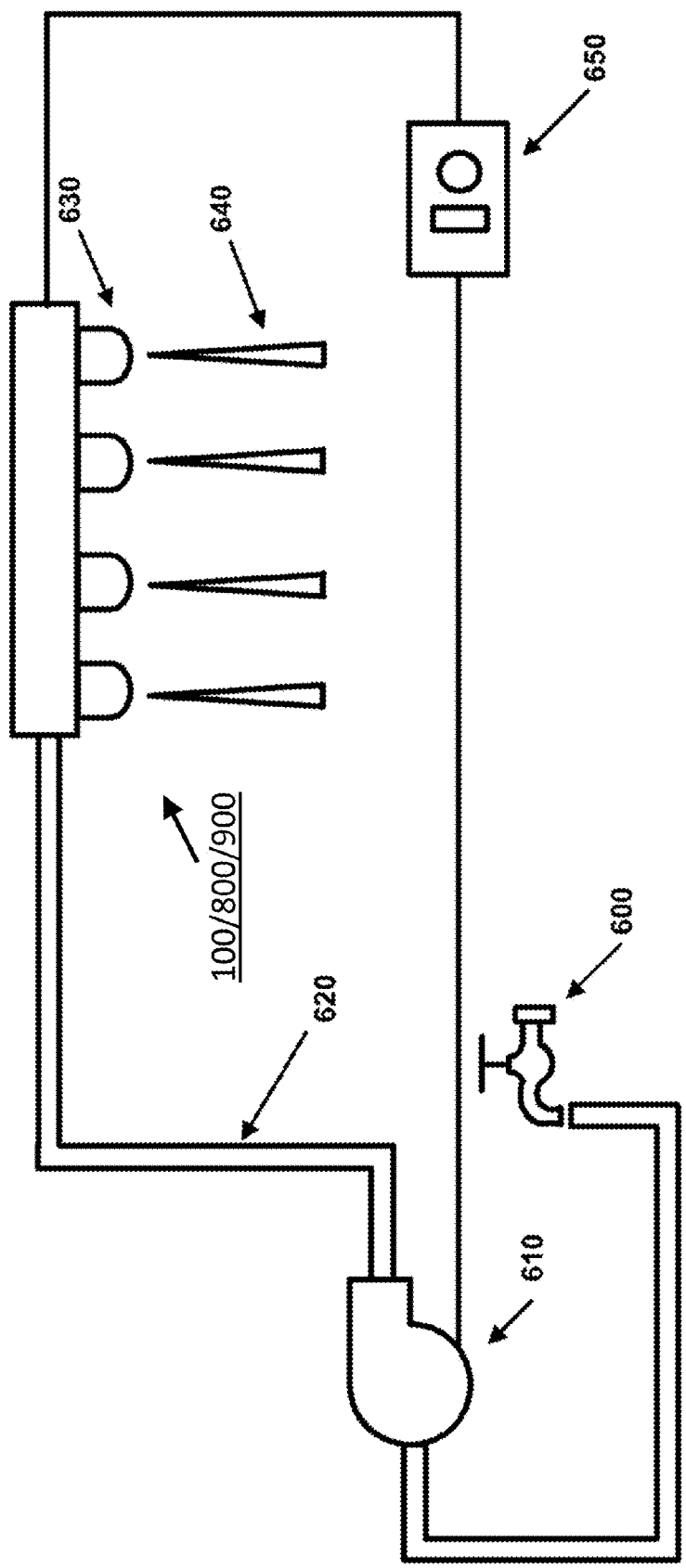
FIG. 22 is a schematic representation of some functional elements according to an implementation hereof; and, FIG. 23, which includes subpart FIGS. 23A, 23B and 23C, provides schematic views of some alternative implementations hereof.

FIG. 22 illustrates a method of delivery of the water in certain implementations. The water source 600 delivers water to the high-pressure misting pump 610. The high-pressure misting pump sends pressurized water through a water line 620, e.g., high pressure nylon tubing, and into the delivery apparatus, system or array 630 of devices 100/800/900 to provide for an issuance of a stream of mist 640. A power and/or control station 650 is also shown in FIG. 22 representing the power supply to the pump 610 and/or the misting units particularly if fans or other electrical means are included therewith.

The high-pressure misting pump of FIG. 22 may have some or all of the following features. The pump may operate on a high pressure/low flow pumping system, at about 800-1000 psi operating pressure. The pump may have features that are standard to the industry, such as a 120 volt wall plug-in, a 5 micron filter, and a standard hose bib water connection. The placement of the pump may be away from the operating environment to minimize exposure to the elements. The pump's relatively simple design should require minimum maintenance. A single pump can support multiple ports through which the water is atomized.

The nozzle, as in any of the previous nozzles described herein, may have one or more of the following features. The shape of the nozzle orifice may be small, to produce extremely small water droplet size to facilitate atomization. The nozzle may have a ruby tip to prevent orifice erosion. The orifice may have multiple sizes, such as 0.003", 0.004", 0.006", 0.008", to suit a variety of conditions and environments. The nozzle may have an about 100 psi check valve and an about 600-1000 psi operating pressure. A filter insert may help resist clogging, and the nozzle may be designed for easy finger tight replacement.

FIG. 23, see sub-parts 23A, 23B and 23C, includes three non-limiting variations on systems for implementations hereof. As introduced above and shown in FIG. 23A, a device 100/800/900 can be implemented in association with a ductwork 701 of an air (or other gaseous) supply system 700. A fan or other movement sub-system 711 may be used to move the air in the ductwork 701 to and ultimately through the device 100/800/900. A water supply 600 is shown schematically providing water (or other cooling fluid) to a water line 620 for delivery to the nozzle 200. The water line may be alternatively entirely within the duct work (not shown), or entirely outside of the ductwork (providing to an external portion of the device 100/800/900, also not shown), or may be as shown, partly exterior to and partly disposed within the ductwork as by being passed through a hole therein. An air flow from the ductwork can then carry the mist from the nozzle, and particularly as may be variably directed, the device can be used for controlling the direction of delivery of the mist. The air flow rate can be used also to provide a variable for the delivery of the distance and/or speed of the mist.

The alternative of FIG. 23B involves no ductwork and an optional air supply system 700 with optional fan 711. Note the fan may be disposed in the mounting unit 300/400 (though not shown) with the apparatuses 100/800/900 or may be external thereto. Note the water supply and water line may be relatively easily connected in this example. Also note the use of the mounting member 300 and/or 400 in FIG. 23B. Though not shown in FIG. 23A, such a mounting member might be used there as well; however, with an otherwise pre-assembled ductwork, the device might either be connected directly thereto, or to or on a wall behind which the ductwork may be disposed.

The alternative of FIG. 23C involves a relatively self-contained apparatus 500 like those of FIGS. 20 and 21 with an apparatus 100/800/900 disposed therein. Here, it may be seen that the air supply 700 is incorporated in the form of a fan 711 disposed within the apparatus 500/100/800/900. The water supply 600 and water line 620 may be disposed to provide water in a fashion like that schematically shown here. Note the functional containment of air movement device 711 within the same apparatus as the nozzle 200 as shown her could also be used with the mounted unit assembly of FIG. 23B as well.

Note, if apparatuses 800/900 are used with angular arms 81*a*, 810*b*, 810*c* and/or arms 910*a*, 910*b*, 910*c* with or without their respective louvers or deflector structures 920*a*, 920*b* and 920*c*, then, a circular or rotational or cyclone or spiral or other non-linear type flow, such as flow 955 as shown in each of FIGS. 23A, 23B and/or 23C may be achieved.

Having described a variety of implementations, numerous other alternative implementations or variations might also and/or alternatively be made. Alternative implementations of the apparatus can be variants on the shape, array, and arrangement so that the nozzle or nozzles and/or air flow devices and flow channels may be disposed in a variety of configurations.

The present apparatus has been described in detail including various implementations thereof. However, it should be appreciated that those skilled in the art, upon consideration of the present disclosure, may make modifications and/or improvements on the apparatus hereof and yet remain within the scope and spirit hereof as set forth in the following claims.

What is claimed is:

1. A water-misting, cooling apparatus for providing a cooling water-mist stream into an open non-confined environment, the water-misting, cooling apparatus comprising:

a body portion having a flow channel defined therein for gaseous air flow therethrough, the flow channel having a circular egress;

a nozzle operatively disposed within the flow channel at the circular egress;

said nozzle adapted to direct a cooling water-mist therefrom; and, one or more arms connected to the body portion and angularly disposed relative to the nozzle, the channel and the nozzle being configured and operatively disposed relative to each other so that a gaseous air flowing through the channel and the cooling water-mist are combined into a cooling water-mist stream and evaporatively-cooled gaseous air stream directed from the apparatus into the surrounding open non-confined environment, the one or more arms configured to provide a non-linear outflow;

the non-linear flow defined by the one or more arms as one or more of circular, spiral, cyclone or rotational; and, the non-linear flow providing for moving the air into better contact with water exiting at the water outlet to mix with the air with the water to generate mist;

the apparatus further comprising:

a mounting bracket with a first end and a second end, said mounting bracket being fixed to opposing ends of an outer perimeter of the body portion at the first end and the second end of the mounting bracket.

2. An apparatus as recited in claim 1, wherein the body portion includes two portions; an outer body portion; and an inner body portion adapted to be disposed on or within the outer body portion; wherein the inner body portion has the flow channel defined therein between a first end of the apparatus and a second end of the apparatus wherein optionally, the inner body portion is movable within the outer body portion to provide a directional egress for the fluid stream and, wherein optionally the outer surface of the inner body portion is rounded in a manner that enables rotational movement within the outer body portion.

3. An apparatus as recited in claim 2, the arms providing for the non-linear flow.

4. An apparatus as recited in claim 1, wherein the one or more arms are affixed to both the inner surface of the channel and to the nozzle to hold the nozzle in a fixed position within the channel.

5. An apparatus as recited in claim 1, wherein the nozzle is adapted to be coupled to a water line at the first end of the apparatus.

6. An apparatus as recited in claim 1, wherein the apparatus is connected to a mounting unit.

7. An apparatus as recited in claim 1, wherein the apparatus is operatively associated with a gas ducting system for the provision of a gas flow thereto.

8. An apparatus as recited in claim 1, wherein the apparatus is operatively associated with a fan for the provision of a gas flow thereto.

9. An apparatus as recited in claim 8, wherein the fan is disposed one or more of externally thereof or disposed therewithin.

10. An apparatus as recited in claim 1, further comprising one or more louvers or deflector structures to provide for a non-linear outflow.

11. An apparatus as recited in claim 1, wherein the surface of the structure is an interior surface of a building.

12. A system for dispersing cooling water mist into an open non-confined environment, the system comprising:

an apparatus for delivering the cooling water mist into the open non-confined environment, the apparatus comprising:

a body portion with a channel between a first end of the apparatus and a second end of the apparatus, the channel having a circular egress at the second end;

a nozzle operatively disposed within the channel at the circular egress;

said nozzle adapted to direct cooling water mist through the second end of the apparatus into the surrounding environment;
one or more arms angularly disposed relative to the nozzle and connected to the apparatus;
a water line adapted for delivering water to the apparatus;
a propulsion mechanism configured for mixing air with the water and directing the mixed air and water as a cooling water mist and evaporatively-cooled gaseous air stream into the surrounding environment,
the one or more arms configured to provide non-linear outflow;
the non-linear flow defined by the one or more arms as one or more of circular, spiral, cyclone or rotational; and,
the non-linear flow providing for moving the air into better contact with water exiting at the water outlet to mix with the air with the water to generate mist; and,
a mounting bracket with a first end and a second end, the mounting bracket being connected to the body portion.

13. A system according to claim 12, wherein one or both:
the non-linear flow is one or more of circular, spiral or rotational or otherwise; and,
the non-linear flow provides for moving the air into better contact with water exiting at the water outlet to mix with the air with the water to generate mist.

14. A system according to claim 12, further comprising one or more louvers or deflector structures to provide for a non-linear outflow.

15. A method for delivering cooling water mist into an open non-confined environment, the method comprising:
situating an apparatus for cooling water mist dispersion in an open non-confined environment;
channeling a stream of cooling water mist through the apparatus via a nozzle disposed within the apparatus at a circular egress of the apparatus,
directing the stream of cooling water mist in a particular manner such that the air in the environment is cooled by the evaporative action of the cooling water mist,
diverting outflow by one or more arms angularly disposed relative to the nozzle, the one or more arms providing for a non-linear outflow of mixed air and water as a cooling water mist and evaporatively-cooled gaseous air stream into the surrounding open non-confined environment, the non-linear flow defined by the one or more arms as one or more of circular, spiral, cyclone or rotational; and, the non-linear flow providing for moving the air into better contact with water exiting at the circular egress to mix with the air with the water to generate mist;
the apparatus comprising a mounting bracket with a first end and a second end, said mounting bracket being fixed to opposing ends of an outer perimeter of the apparatus at the first end and the second end of the mounting bracket.

16. A method according to claim 15, wherein the operation of directing the stream of water includes one or both:
the non-linear flow is one or more of circular, spiral or rotational or otherwise; and,
the non-linear flow provides for moving the air into better contact with water exiting at the water outlet to mix with the air with the water to generate mist.

17. A method according to claim 15, wherein the operation of directing the stream of water includes one or both:
pumping the water through the nozzle; and,
fanning an air stream adjacent the water to carry the water.

18. A method according to claim 15, wherein the method further comprises creating a mist of the water at the nozzle and evaporating the mist in air.

19. A method according to claim 15 further comprising one or more louvers or deflector structures to provide for a non-linear outflow.

* * * * *